March 6, 1945.  T. M. FERRILL, JR  2,370,724
ELECTRIC SYSTEM
Original Filed Oct. 18, 1940   9 Sheets-Sheet 1

INVENTOR
Thomas Murray Ferrill, Jr.
BY
David Rines
ATTORNEY

March 6, 1945.  T. M. FERRILL, JR  2,370,724
ELECTRIC SYSTEM
Original Filed Oct. 18, 1940   9 Sheets-Sheet 2

INVENTOR
Thomas Murray Ferrill, Jr.
BY
ATTORNEY

March 6, 1945. T. M. FERRILL, JR 2,370,724
ELECTRIC SYSTEM
Original Filed Oct. 18, 1940   9 Sheets-Sheet 5

Inventor
Thomas Murray Ferrill, Jr.
BY
David Rines
ATTORNEY

March 6, 1945. T. M. FERRILL, JR 2,370,724
ELECTRIC SYSTEM
Original Filed Oct. 18, 1940 9 Sheets-Sheet 6

INVENTOR
Thomas Murray Ferrill, Jr.
BY
ATTORNEY

March 6, 1945.  T. M. FERRILL, JR  2,370,724
ELECTRIC SYSTEM
Original Filed Oct. 18, 1940   9 Sheets—Sheet 8

Patented Mar. 6, 1945

2,370,724

UNITED STATES PATENT OFFICE 2,370,724

ELECTRIC SYSTEM

Thomas Murray Ferrill, Jr., East Hempstead, Long Island, N. Y., assignor to National Company, Inc., Malden, Mass., a corporation of Massachusetts Original application October 18, 1940, Serial No. 361,713. Divided and this application August 5, 1941, Serial No. 405,500

30 Claims. (Cl. 250—40)

The present invention relates to electric systems, and more particularly to systems adapted to use in connection with vacuum tubes, as tank circuits. The present application is division of application Serial No. 361,713, filed October 18, 1940.

The type of transmitter tank circuit in most common use is a combination of a fixed coil and a variable condenser. As the majority of applications require a balanced tank circuit—one in which three terminals are provided, two terminals symmetrical about a third or center-tap terminal, to produce voltages of equal magnitudes and opposite phases—the variable condensers often employ mechanically and electrically symmetrical construction, and the fixed coils are often provided with a center-tap connection. A cylindrical-form, helical-wound coil, when provided with an accurately located center-tap connection, is a completely symmetrical and electrically balanced fixed inductor. Variable inductors, electrically balanced and symmetrical, have also been proposed.

In the construction of a balanced variometer, a divided stator consisting of two approximately equal fixed coil sections is provided. Connected between the two fixed coil portions of the stator is a rotor coil fastened upon a rotor shaft which serves for adjustment of the inductor. The rotor coil may be turned to a position in which it causes marked increase of the inductance of the variometer beyond that of the stator alone, or to a position in which it causes the inductance of the variometer to drop below that of the stator coil alone.

An object of the invention is to provide an intermediate connection tap upon the rotor winding of the variometer. A completely symmetrical model of this variometer would employ a divided stator consisting of two exactly equal coils. Between these two equal stator coils would be connected an accurately center-tapped rotor winding. Three important connections to the balanced variometer are then made possible—two end connections, completely symmetrical about a third connection—so that the variometer is electrically balanced and symmetrical.

The range of frequencies to which the conventional fixed coil and variable condenser tank may be made resonant, or tuned, is limited by the range of tuning capacitance provided by the variable condenser. If the inductor is arranged for adjustment to different inductance values, so that when the tuning capacitance is increased, the inductance may also be increased, and when the capacitance is decreased, the inductance may also be decreased, the tuning range of the tank is greatly increased. A further improvement resulting in the tank circuit is the provision of more nearly constant ratio of inductance value and capacitance value. Since thorough design of a radio transmitter results in a specific optimum value of this ratio for each tank-circuit application, arrangement of the inductor to have increase of inductance by approximately the same percentage as the increase of capacitance of the variable condenser permits optimum tank-circuit operation throughout a very wide range of frequencies.

A further object of the present invention is to provide for coverage of a wider range of frequencies without disconnection or switching of inductors or capacitors, in balanced as well as unbalanced tanks.

Another object of the invention is to provide more nearly constant ratio of inductance value to capacitance value throughout the tuning range of tanks, by connection of variable inductors and variable capacitors.

With a variometer and a variable condenser to provide wider frequency range than the present fixed-coil systems, the range is limited by inductance range and capacitance range, taken as a product. Still further increase of the tuning range of a tank may be obtained if a lower-frequency variometer-and-variable-condenser combination, connected in parallel to form a resonant circuit for wide-range low-frequency tuning, be connected in series with the inductor of a high-frequency combination of a variable inductor and a variable condenser. The entire tank combination thus formed responds, at any setting of coils and condensers, to two frequencies as a conventional resonant tank—to the frequency at which the low-frequency tank section is resonant (with the added capacitance value contributed by the high-frequency condenser-and-inductor combination), and to the frequency at which the high-frequency tank section is resonant (with the inductance value effectively reduced somewhat by the net effect of the connection of the low-frequency tank section in series with the high-frequency inductor). The larger inductance and capacitance values of the low-frequency tank section, and the smaller inductance and capacitance of the high-frequency tank section, may be proportioned in such a way as to provide two simultaneous tuning ranges which meet, which overlap, or which do not meet, in which last case a gap is left between the two frequency ranges of the tank sections.

Another object of this invention is to provide such a dual combination of tank circuits, electrically connected, so that the sections may automatically respond to impressed voltages of either of two frequencies for any adjustment.

By use of both variable inductance and variable capacitance in each of the two sections of this combination tank, the maximum total frequency range is obtained. By mechanical connection of the adjusting shafts or other adjustment mechanisms of the variable inductance and capacitance elements, a single tuning knob or dial may be used to tune the tank simultaneously through the two frequency ranges provided.

Another object of this invention is to provide an electrical combination of two or more tank sections simultaneously resonant at different frequencies.

An additional object is to provide a mechanical connection of the inductance and capacitance elements so that one control knob may be used to operate the different elements and the different sections simultaneously.

The invention will now be described more fully in connection with the accompanying drawings, in which.

The low-frequency tank circuit will be described first. It is illustrated as comprising two series-connected high-capacity low-frequency tuning condensers, respectively provided with a stator and a rotor. Each stator is constituted of stationary-condenser plate sections, respectively shown at 45 and 47, and each rotor of cooperating rotary-condenser plate sections, respectively shown at 49 and 51. The rotors 49 and 51 are electrically connected together by mounting them on a common rotor metal tuning shaft 9, that may be turned by means of a knob 58 at one end thereof.

The tank circuit comprises also a tank section comprising a balanced variometer, provided with a low-frequency inductor constituted of a stator winding and a rotor winding 5. The stator inductor winding is intermediately broken or interrupted, so as to form two separated fixed stator inductor-winding portions or divided halves 1 and 3, respectively provided with inner ends or terminals 7 and 17, and outer ends or terminals or conductors 14 and 12. These outer ends 14 and 12 are respectively connected to the condenser stators 47 and 45 to constitute the terminals or ends 83 and 82 of the tank circuit. The balanced variometer is thus connected in a balanced tank circuit with the split-stator condenser 45, 47, 49, 51 to provide a novel combination comprising a balanced variometer and split-stator condenser.

Figures 3, 4:
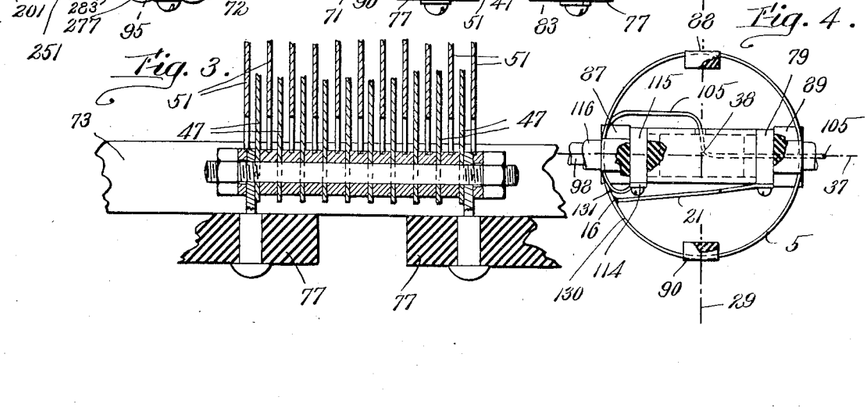
Fig. 3 is a section, upon a larger scale, taken upon the line 3—3 of Fig. 1, looking downward, in the direction of the arrows.
Fig. 4 is a fragmentary section taken upon the line 4—4 of Fig. 1, looking in the direction of the arrows, with parts broken away.
Figure 5:
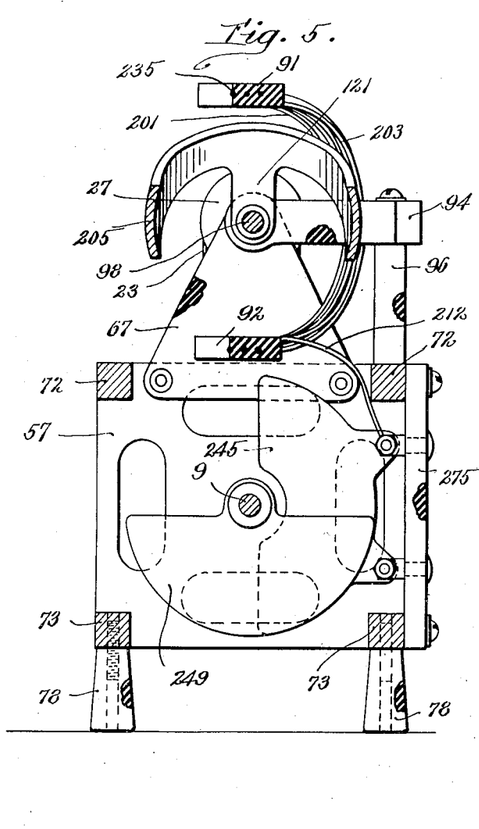
Figs. 5 and 6 are vertical transverse sections taken upon the lines 5—5 and 6—6, respectively, of Fig. 1, looking in the directions of the respective arrows, parts being omitted, for clearness.
Figure 6:
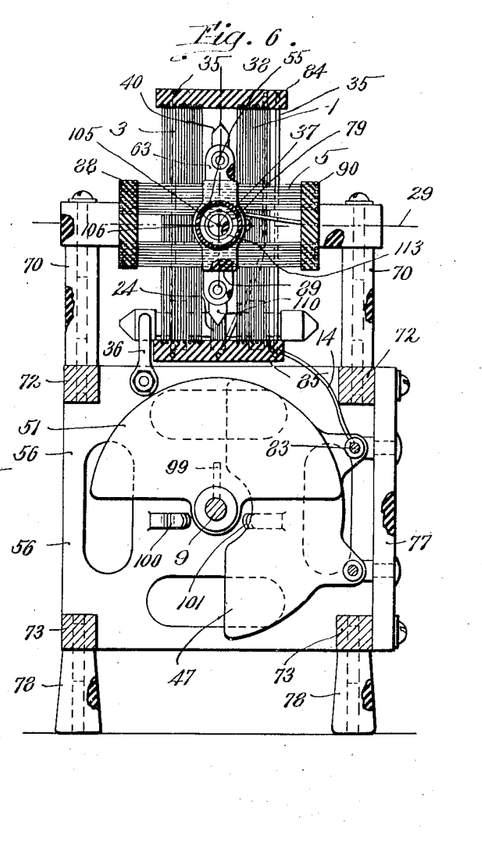

The winding 5, which is mounted upon an insulating shaft 55, so as to be rotatable therewith, is connected at its ends, through connections presently to be described, to the respective inner interrupted ends 7 and 17 of the stator inductor winding portions 1 and 3. The rotor winding 5 may also be regarded as divided into two parts, disposed on opposite sides of an intermediately disposed or center tap 16. In reality, however, the winding 5 is continuous. The center tap is shown visible in Fig. 4 by breaking away adjacent turns of the winding at 130 and 131.

The inductor rotor 5 and the condenser rotors 49 and 51 are mechanically coupled to render them simultaneously adjustable from maximum to minimum inductance and capacity. This mechanical coupling may be effected in any desired way, as illustrated in my articles, entitled "A single-control wide-range tank circuit," QST, November, 1939, page 28, and "Five bands without changing coils," QST, December, 1939, page 43. It is preferred, however, as illustrated herein, to actuate the rotor 5 from the condenser shaft 9, as by means of a belt 23 mounted over a pulley 25 on the other end of the shaft 9 and a pulley 27 on a metal extension 98 of the shaft 55 of the rotor winding 5. It will be convenient hereinafter to refer to the shaft by the reference numerals 55 or 98 or 55, 98.

A more or less open-work metal casing for housing the condensers and supporting the inductor is illustrated as provided with metal end walls 56 and 57 connected by upper metal braces 72 and lower metal braces 73, and supported upon insulating legs 78 secured to the lower braces 73. The condenser stators 45 and 47 are shown mounted upon insulating members 75 and 77, respectively, secured to pairs of upper and lower braces 72 and 73.

The shaft 9 is shown journalled in, so as to be electrically connected to, the metal end walls 56 and 57. The shaft 55, on which the inductor rotor winding 5 is mounted, is journalled directly above and parallel to the shaft 9 in insulating bars 63 and 69, the former supported by a pair of insulating pillars or posts 70, and the latter by a pair of insulating pillars or posts 71. The bars 63 and 69 serve as insulating bearings for the rotor shaft 55. The pillars 70 are supported by the upper metal braces 72 near the end wall 56, and the pillars 71 are intermediately supported by the same braces 72 between the walls 56 and 57. The metal extension 98 of the shaft 55 is journalled also in an insulating plate extension 67 shown supported directly by the metal end wall 57. It will be convenient to designate the fixed axis of the shaft 55, 98 by the reference numeral 37. The pulley 27 is shown separated from the plate extension 67 by a bushing or collar 28.

The divided stator windings 1 and 3 are coaxially supported as a unit at points spaced about ninety degrees at the inner surfaces of the insulating bars 63 and 69 and two further insulating bars 84 and 85. Their common fixed axis is indicated at 29, perpendicular to the fixed axis 37 of the shaft 55, 98. They are spaced from each other along the fixed axis 29 on opposite sides of the axis 37. The insulating supporting bars 63, 84, 69 and 85 for the coils 1 and 3 enable their being wound in free air.

The inductor winding 5 is similarly air wound through its support as a unit at the outer surfaces of four insulating members 87, 88, 89, 90, disposed at intervals of 90 degrees. It is disposed within the windings 1 and 3, with its two parts on opposite sides of the center tap 16, spaced slightly from each other along a rotatable axis 38, on opposite sides of the axis 37. The axis 38, like the axis 29, is disposed at right angles to the axis 37. The rotor 5 is thus rotatably adjustable about the axis 37 partly in the region of separation of the windings 1 and 3.

The limits of simultaneous adjustment of the rotor winding 5 and the tuning condensers are determined by a stop finger 99 rigidly fixed to the shaft 9 for engaging oppositely disposed limit stops 100 and 101 on the end plate 56. A maximum variation of inductance is provided during the rotation of the rotor winding 5 through 180 degrees from one of these extreme positions to the other. The maximum inductance is obtained when the axes 37 and 29 of the rotor and stator coils are coincident in one limiting position, and minimum inductance in the other limiting position. When the rotor winding 5 occupies its intermediate position, illustrated in Figs. 1, 2, 4, 6, 7 and 8, its axis 38 is disposed at right angles to the fixed axis 29 of the stator windings 1 and 3.

Figure 7:
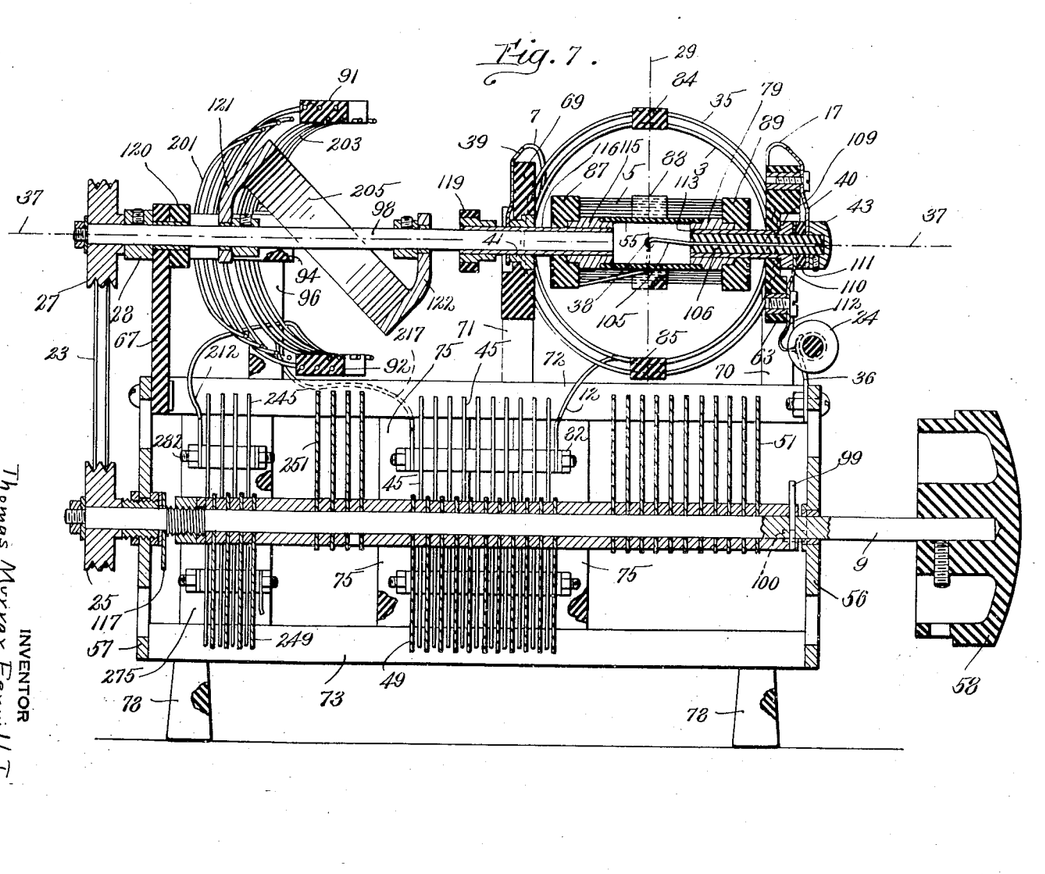
Fig. 7 is a vertical longitudinal section, taken upon the line 7—7 of Fig. 2, looking in the direction of the arrows, parts being broken away, and other parts omitted, for clearness.
Figure 8:
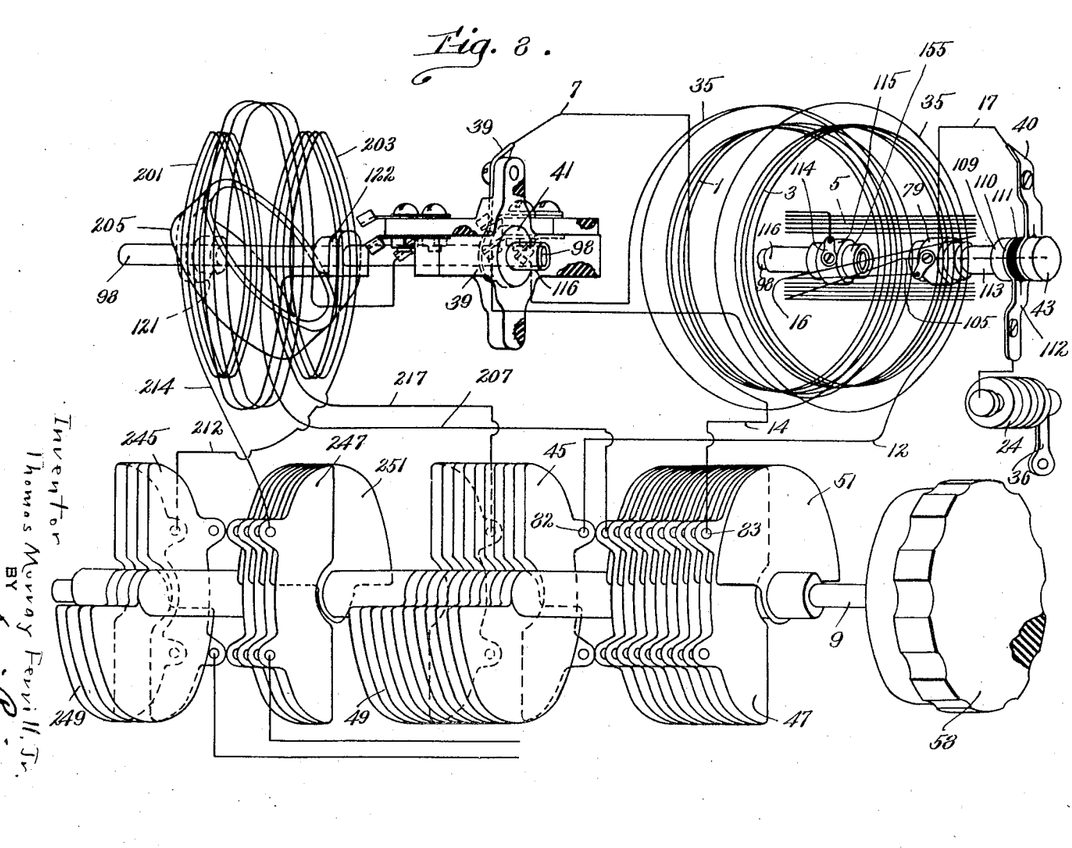
Fig. 8 is an exploded diagrammatic perspective, with parts of the apparatus relatively displaced, the better to show electrical connections.

The mechanism for maintaining the inductor rotor 5 electrically connected between the windings 1 and 3 during its rotatable adjustment to provide an accurate electric balance in all positions of the inductor rotor 5 will now be described. Collars or bushings 41 and 43 are mounted upon the shaft 55, 98, so as to rotate therewith, externally to the coils 1 and 3, as illustrated more particularly in Fig. 7. The bushings 41 and 43 are respectively in continuous engagement with brushes or wiping blades 39 and 40, respectively mounted upon the bars 69 and 63, and respectively connected electrically to the terminals 7 and 17 of the divided-stator windings 1 and 3. The ends of the inductor rotor 5 are respectively connected to the collars or bushings 41 and 43, so as to be maintained electrically connected to the ends 7 and 17 of the winding parts 1 and 3 during the rotatable adjustment of the rotor 5. The connection of one end of the rotor inductor 5 to the collar 43 is through the medium of a conductor 105 that, as shown more particularly in Fig. 7, is extended through a drilled insulating center 106 of the shaft 55, and into contact with the collar 43. The connection of the other end of the rotor inductor 5 to the collar 41 is made to a terminal 114 that is electrically connected to a conducting collar 115 of the shaft 55. The collar 115, as shown more particularly in Fig. 7, is mounted outside of, and in electrical contact with, a metal bushing 116 that is rotatably mounted about, and in electrical contact with, the shaft 98. The bushing 116 carries, so as to be in metallic contact with, not only the collar 115, but also the collar 41. Electrical connection is thus established between the collar 41 and the terminal 114 which, as before stated, is connected to the said other end of the rotor winding 5.

Since all adjustments are effected, in operation, by manipulation of the knob 58, in front of, or to one side of, the casing, the danger to the operator is minimized. The metal parts are at high voltage, but there is an insulated coupling between the condenser shaft 9 and the tuning dial (not shown).

One end of a conductor 21 is connected to the intermediately disposed or central tap 16 of the inductor rotor 5. This end of the conductor 21 may, of course, be connected to either of the stator winding portions 1 and 3, as well, but this would be at the expense of electrical balance. The other end of the conductor 21 is connected to a conducting bushing 79 that, as shown more particularly in Fig. 7 is mounted outside of and in metallic contact with a metal bushing 113 that is provided at its free end with an integral collar 109. The shaft 55 is shown as comprising an insulating hollow tube rigidly connected at its ends to the collars 115 and 79. The drilled insulating center 106 is disposed in the bushing 113 so as to rotate therewith and with the collar 109. During the rotation of the shaft 55, 98, therefore, the collar 109 engages constantly a brush or wiping blade 110 that is separated from the brush 40 by an insulating collar 111. The presence of the insulating collar 111 enables the collars 43 and 109 to engage continuously the respective brushes 40 and 110 without interference one by the other. The brush 110 is connected by a conductor 112 to one end of a radio-frequency choke coil 24, thus providing a direct-current connection for this choke coil 24. The other end of the choke coil is connected by a conductor 36 to the metal end wall 56. As the wall 56 is metallically connected to the shaft 9, and as the shaft 9 is electrically connected to a point between the condenser rotors 49 and 51, as before described, the tap 16 of the inductor rotor 5 is thus connected by the conductors 21 and 112, through the collar 109 and the brush 110, to the radio-frequency choke coil 24 which, in turn, is connected, by the conductor 36, to the condenser rotors 49 and 51. The conductor 36, for convenience, is illustrated in the circuit diagrams as connected to the condenser-rotor shaft 9 by way of a conductor 15.

The invention is operable also without the radio-frequency choke coil 24; the connection of the conductor 21 would, in that case, be made direct to the condenser shaft 9.

A link inductor loop 35 may be inductively arranged in fixed relation to the variometer 1, 5, 3, for taking current from, or transmitting it to, this variometer. It is shown fixedly supported just outside the inductor 1, 3, at the outer surfaces of the same insulating bars 63, 69, 84 and 85 that support the inductor windings 1, 3. The coupling between the loop 35 and the variometer may, of course, be tightened or loosened by varying the number of turns in the coil 35. One end 132 of the loop 35 is connected to a terminal 133, and its other end 134 to a terminal 135. The terminals 133 and 135 are mounted upon an insulating plate 137 supported on the insulating member 69.

Figure 1:
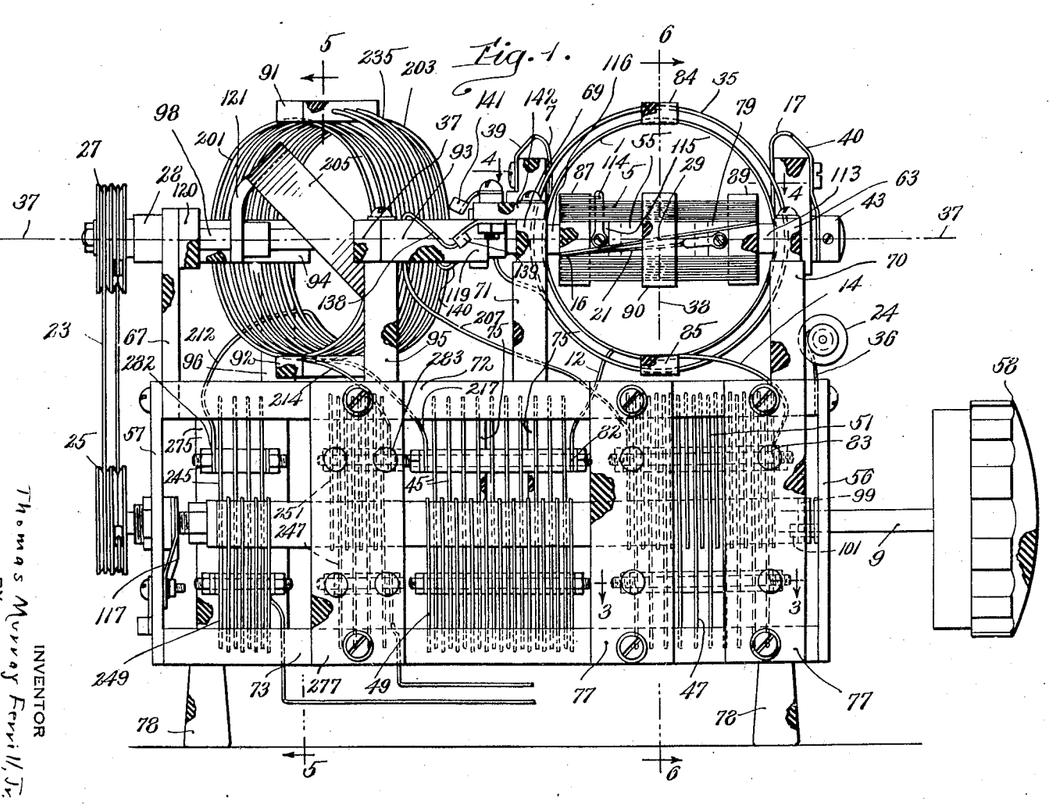
Fig. 1 is a side elevation of a tank circuit apparatus embodying two tank sections in accordance with the present invention.
Figure 2:
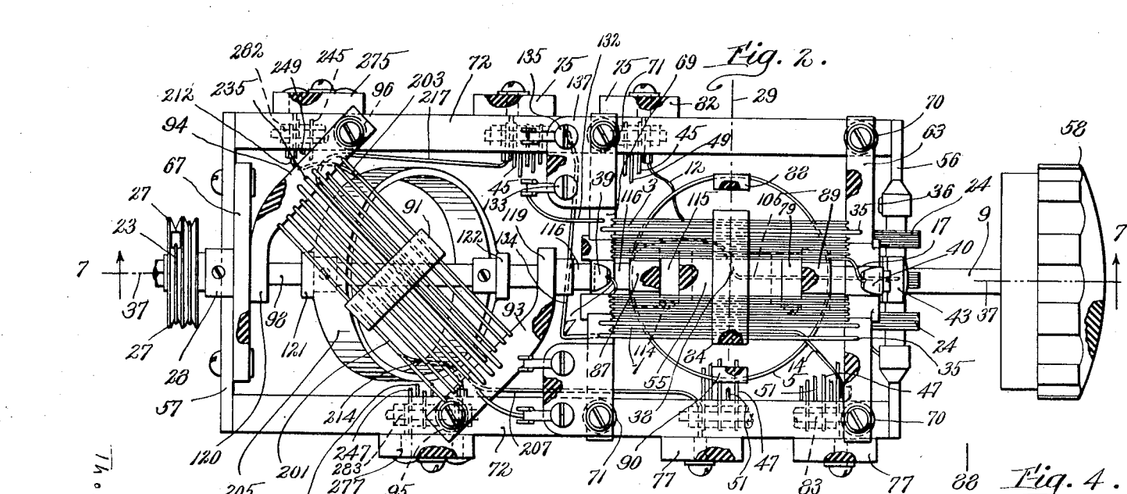
Fig. 2 is a plan of the tank of Fig. 1, with parts broken away and other parts omitted, for clearness.
Figure 9:
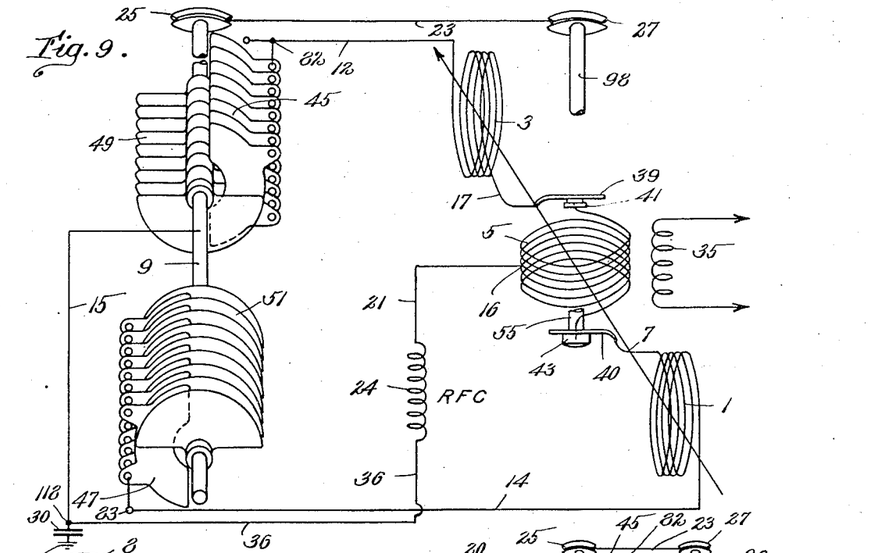
Fig. 9 is a schematic diagram of connections of a tank circuit embodying a tank section in accordance with the present invention.

Referring, now, to Fig. 9, the tank circuit may be traced from the one of its terminals 82, by parallel paths, to its other terminal 83. One of the parallel paths extends through the condenser 45, 49, and by way of the condenser-rotor shaft 9, through the condenser 51, 47. The other parallel path may be traced by way of the conductor 12, through the inductor 3, 5, 1, and by way of the conductor 14. As before explained, the condenser-rotor shaft 9 is shown connected, by way of a conductor 15, to the terminal 118, which may be connected, through a blocking condenser 30, to a ground 28. The conductor 15 may be regarded as connected to a terminal 117 mounted, as illustrated in Fig. 1, on the end wall 57. The tap 16 is also shown connected to the terminal 118 and the conductor 15 and ground 28 through the conductor 21, the radio-frequency choke coil 24 and the conductor 36.

Figure 10:
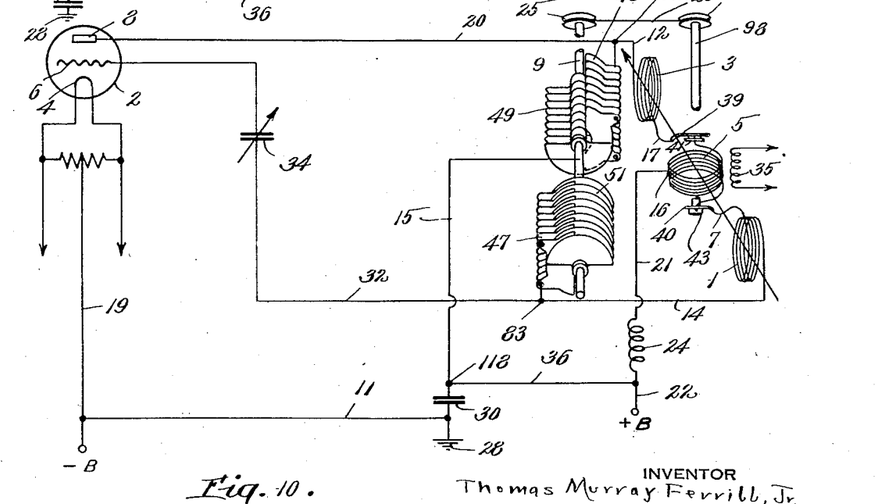
Fig. 10 is a circuit diagram of a series-feed single-tube amplifier circuit embodying the tank circuit illustrated in Fig. 9.
Figure 14:
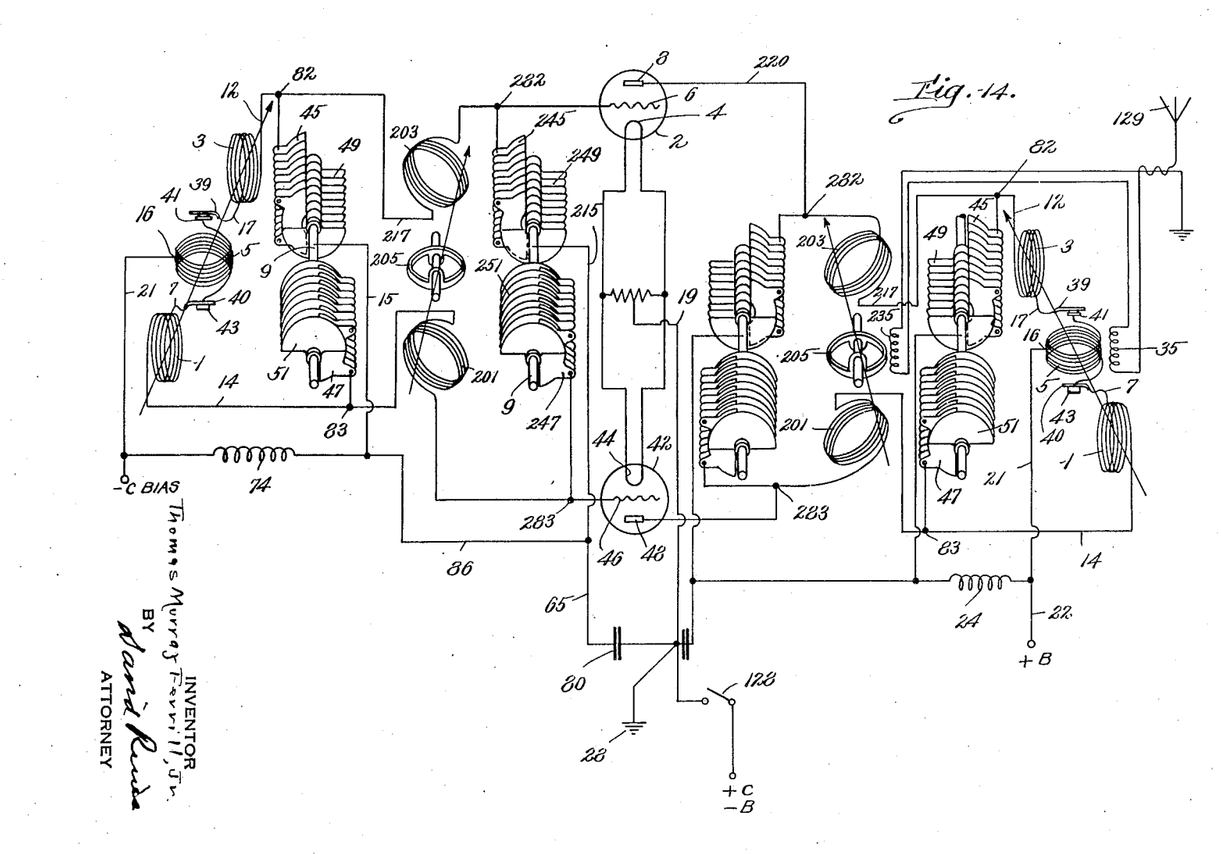
Fig. 14 is a circuit diagram illustrating a push-pull amplifier with complete tank circuits, which may be built in the form shown in Figs. 1 to 8 according to the present invention, connected in both the grid and plate circuits thereof.

Either the output or plate circuit or the input or grid circuit of a vacuum-tube system may be provided with the tank circuit of the present invention. As an illustration of use, the tank circuit is shown in Fig. 10 connected in the output or plate circuit of a single vacuum-tube amplifier 2, between the cathode 4 and the plate or anode 8. The tube 2 may constitute one of a train of vacuum tubes (not shown), with its grid or input circuit (not shown) between the cathode 4 and a control electrode or grid 6, connected to a preceding tube of the train. The end or terminal 82 of the tank circuit is connected by a conductor 20 to the anode 8. The other end 83 of the tank circuit is connected to the control electrode 6 by a conductor 32, through a neutralizing condenser 34. The condenser 30, and the ground 28 are connected, by way of conductors 11 and 19, to the cathode 4. The negative and positive terminals of a direct-current source are respectively indicated at −B and +B, the former being shown grounded at 28, and the latter being connected to the radio-frequency choke coil 24 and the conductor 36 by a conductor 22. This direct-current source may be constituted of the usual plate-supply high-voltage source, but it is not, of course, a source that is necessarily capable of modulation. It may or may not be modulated. The conductor 19 may connect the cathode 4 not only to the −B terminal of the plate-supply battery, but also to the positive +C terminal of a C bias battery, as illustrated in Fig. 14.

The direct-current path of the plate circuit may be traced from the negative terminal −B, by way of the conductor 19, through the cathode 4 and the anode 8 and, by way of the conductor 20, the terminal 82 of the tank circuit, and the conductor 12, to the stator inductor-winding portion 3. The direct-current circuit continues through the winding portion 3 and one of the above-described parts of the inductor rotor 5, to the center tap 16; and from the tap 16, by way of the conductor 21, through the radio-frequency choke coil 24, and by way of the conductor 22, to the positive terminal +B of the direct-current source.

Two or more tank circuits of this nature may be connected together for extending the frequency range of the tuning adjustment. A second such tank circuit, of higher resonant frequency, may be connected, as illustrated, for example, in Fig. 11, to provide a tank circuit within a tank circuit, or a ganged tank circuit. An additional higher-frequency stator inductor is internally interrupted to form divided inductor-winding portions 201 and 203, cooperating inductively with an additional rotor-winding 205, in the form of a single large short-circuited loop, which is unprovided with a center tap. The high-frequency variable inductor 201, 205, 203 is connected in parallel to two low-capacity series-connected tuning condensers, the split stators of which are shown at 245 and 247 and the rotors at 249 and 251. The stator sections 245 and 247 are shown mounted on insulating members 275 and 277 similar to the members 75 and 77. In the circuit diagrams, the rotors of this two-section tank are shown mounted upon a separate tuning shaft, for convenience, connected to the condenser 30 and the radio-frequency choke coil 24 by a conductor 215, but, as shown in Figs. 1 to 8, the rotors 249 and 251 may be actually mounted upon the same shaft 9 as the condenser rotors 49 and 51, at the opposite end of the casing, adjacent to the pulley 25.

The stator coils 201 and 203 are directly mechanicaly mounted similarly to the coils 1 and 3, about the extension 98 of the shaft 55, except that their common axis is inclined at an angle of 45 degrees to the shaft 55, 98. The rotor loop 205 is similarly mounted at a 45-degree inclination upon the extension 98, by means of offset arms 121 and 122 that are fixed to the shaft extension 98. When the stop finger 99 engages the stop 101, the loop 205 becomes axially alined with the stator coils 201 and 203. When the stop finger 99 engages the stop 100, the axis of the loop 205 becomes positioned 180 degrees away from the axis of the coils 201 and 203. Maximum inductance and capacity and minimum inductance and capacity are obtained with the use of the inductor 201, 205, 203 and the condensers 245, 249, 251 and 247 in the same way as before described.

The coils 201 and 203 and the hereinafter-mentioned coil 235 are supported in insulating members 91, 92, 93 and 94 similar to the insulating members 84, 85, 87 and 89, and similarly positioned. One end of each of the insulating members 93 and 94 is mounted upon an insulating post 95 and 96, respectively, supported by the upper metal bars 72. The other ends 119 and 120 of the members 93 and 94 are provided with eyes by means of which they may be non-rotatably supported by the shaft extension 98.

The stators 245 and 247 are respectively connected to the outer ends or conductors 212 and 214 of the inductor coils 203 and 201 to constitute the terminals 282 and 283 of this second tank circuit. The inner ends or conductors 207 and 217 of the inductor-winding portions 201 and 203 are respectively connected to the terminals or ends 83 and 82 of the low-frequency tank circuit. The low-frequency tank circuit first described becomes thus connected, in series with the high-frequency tank circuit, at its intermediately or centrally disposed point 207, 217. The series connection may be traced from the terminal 82, at one end of the low-frequency tank circuit, by way of the conductor 217, through the coil 203, and by way of the conductor 212, to the terminal 282 of the high-frequency circuit; then, through the condensers 245, 249, 251, 247, to the terminal 283 of the high-frequency circuit; and from this terminal 283, by way of the conductor 214, through the coil 201, and by way of the conductor 207, to the terminal 83 of the low-frequency tank circuit.

A connection is thus provided of one tank section within another tank section to form an increased-range or dual-range tank circuit. The corresponding coils and condensers are mechanically connected or ganged in this manner to form a single-dial-operated tank system.

The frequency ranges of the two tank circuits may overlap slightly at the end of one range and the beginning of the other. The tuning range of the combined or ganged tank circuit is thus greatly increased. In the overlapping region, either of the tank circuits may be employed, but outside of the overlapping region one or the other only is operative. Theoretically, the section that is resonant at the applied frequency operates automatically, with only minor effects from the other section. In the high-frequency range the low-frequency tank circuit, connected at 207, 217 to the high-frequency tank circuit, again theoretically, acts in the latter tank circuit as a negligible capacitor. In practice, the components of the high-frequency tank section cooperate with those of the low-frequency tank section in extending the low-frequency limit of the apparatus, and the low-frequency condenser cooperates with the high-frequency tank section in extending the high-frequency limit of the apparatus.

Let it be assumed that all the variable condensers and variable inductors were set to provide maximum values of capacitance and inductance, as is the case at one extreme of rotation; the tank circuit, as a whole, will then respond to the lowest frequency. This frequency is not determined by the low-frequency tank section alone (coils 1, 3, 5 and condensers 45, 49 and 47, 51). The high-frequency condensers 245, 249 and 247, 251 add capacity which is effectively in parallel with that of the low-frequency condensers; furthermore, the high-frequency coils 201, 203 add to the inductance of the low-frequency coils 1, 3, 5, so that the total circuit inductance is the sum of the two coil groups. To be sure, the inductance component added by the coils 201, 203 is small as compared to the inductance of the coils 1, 3, 5; and this component is not so effective in determining the frequency of the tank as a whole as it would be if the coils were connected directly in series with the leads 12 and 14 (Fig. 11), where they would be directly and fully associated with the low-frequency condensers. Even so, the coils 201, 203 do add inductance which is tuned by the high-frequency condensers.

Considering now the other case, where all the condensers and inductors are at minimum capacity and inductance, respectively, the tank will respond to its highest frequency. In this case, the two inductor groups do not effectively cooperate in determining the high-frequency limit, but the condensers do. The four condenser sections are all in series, and the low-frequency sections, being in series, actually decrease the net circuit capacitance.

According to the present invention, therefore, the capacitance of the high-frequency network is caused to cooperate with the capacitance of the low-frequency network, thereby to increase the resultant low-frequency-network capacitance, and the capacitance of the low-frequency network is caused to cooperate with the capacitance of the high-frequency network, thereby to decrease the resultant high-frequency-network capacitance.

As explained in my said article, entitled "Five bands without changing coils," it is possible, in this manner, to obtain perfect balance, with fixed neutralization, at any frequency from 1.75 to 30 megacycles, for use throughout a low- or high-power transmitter, in radio-frequency amplifiers following a band-switched exciter, and in many other applications, with as much ease as has heretofore prevailed in connection with frequency shifts within a single band.

Where a tank circuit embodying the present invention is used for grid tuning in a stage following a plate-tank circuit, the two separate link coils 35 and 235 may be used. The link 35 serves only on the low frequencies, carrying power from the low-frequency section of the coupled grid tank. The other link 235 couples the high-frequency plate-tank section with the high-frequency coil of the grid tank. The link coil 235 is shown mounted inductively to the coils 201, 203, similarly to the mounting of the link coil 35 with respect to the coils 1, 3. One end 138 of the coil 235 may be connected to a terminal 139 and the other end 140 to a terminal 141. The terminals 139 and 141 may be supported by an insulating plate 142 mounted on the insulating support 69.

The frequency range may, of course, be still further extended by adding one or more further tank circuits, in similar fashion. As illustrated diagrammatically in Fig. 12, for example, a medium-frequency rotor coil 305 may be divided into two parts, with their inner ends 125 and 126 connected by conductors 123 and 124 to the ends or terminals 82 and 83 of the lowest-frequency tank circuit. The outer ends of the divided coil 305 may be connected to the inner ends 317 and 307 of the intermediately interrupted cooperating stator inductors 303, 301, respectively. The outer ends 312 and 314 of the inductor 303, 301 may be connected to the ends or terminals 382 and 383 of this additional tank circuit. Stator condenser sections 345 and 347 are shown respectively connected to the ends 382 and 383 of this tank circuit, and the rotor condenser sections 349 and 351 may be mounted on the same shaft 9, with a conductor 315 leading to the radio-frequency choke coil 24. The ends 382 and 383 are connected by the conductors 217 and 207 to the stator coils 203, 201, respectively, of the highest-frequency tank circuit described above in connection with Fig. 11, which will now, however, be of very much higher frequency. A fourth tank circuit may, if desired, be similarly connected, and so on for any desired multiple-section tank.

Figure 11:
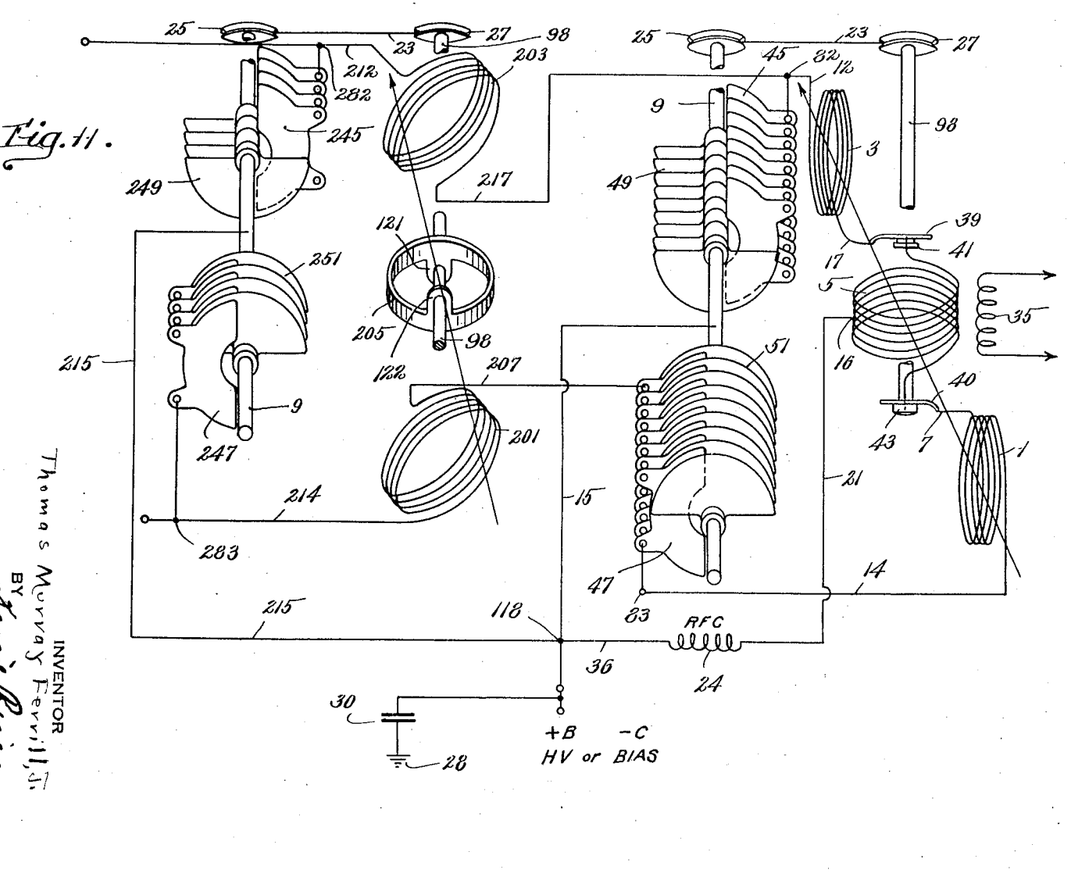
Fig. 11 is a tank-circuit diagram similar to Fig. 9, but embodying the two tank units illustrated in Figs. 1 to 8.
Figure 12:
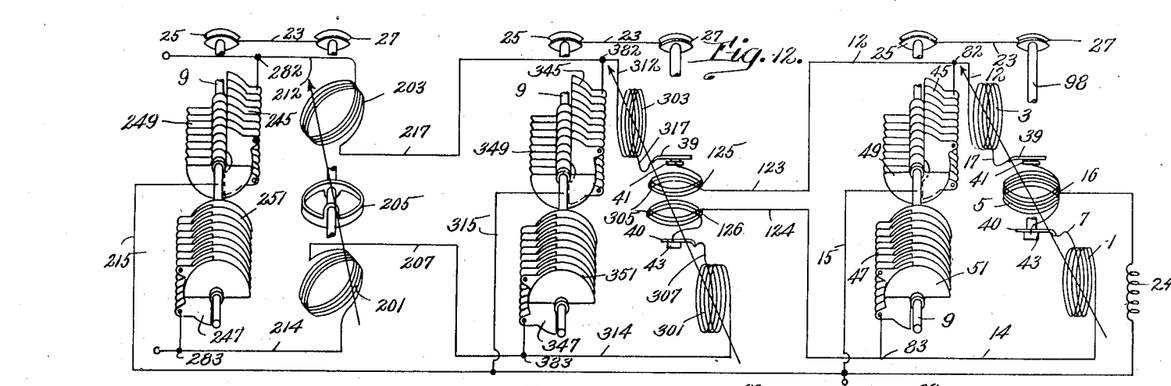
Fig. 12 is a similar tank-circuit diagram embodying three units.

In the push-pull arrangement, illustrated in Fig. 14, where the additional tube 42 is shown provided with a cathode 44, a control electrode 46 and an anode 48, ganged tank circuits similar to the tank circuit of Fig. 11 are shown connected in both the grid and plate circuits. In the plate circuit, a terminal end 282 of a high frequency tank circuit is here shown connected to one of the anodes 8 and the terminal 283 to the other anode 48. In the grid circuit, a terminal 282 of a high-frequency tank circuit is connected to one of the grids 6, and the terminal 283 to the other grid 46. A modulating key 128 may be connected into the conductor 19. The link loops 35 and 235 are shown connected to a grounded antenna 129.

The grid-circuit connections may be traced from the cathode 4, by way of the conductor 19, to the +C terminal of the C bias battery. From the −C terminal thereof, the circuit divides, one path being by way of the conductor 21 to the tap 16 of the rotor 5, and the other through a radio-frequency choke coil 74, to the condenser-tuning shaft 9. A blocking condenser 80, connected by conductors 65 and 86 to the rotor shaft 9 of the grid-circuit tuning condensers, will remove the direct-current voltage from across those condensers.

The plate-circuit connections are similar to the connections illustrated and described above in connection with Fig. 10, except that a ganged-tank circuit is employed, as in the grid circuit.

Figure 13:
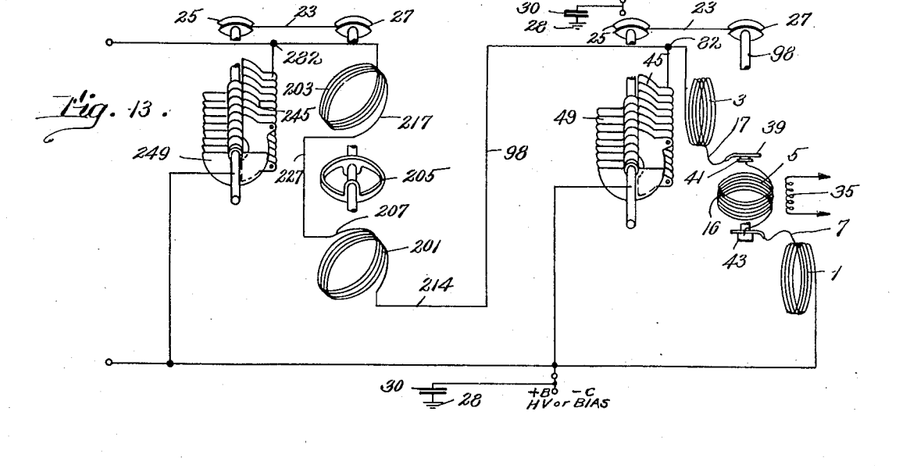
Fig. 13 is a circuit diagram similar to Fig. 11, illustrating a single-ended or unbalanced tank circuit.

It is not essential that the tank circuits of the present invention be always balanced. In Fig. 13, there is shown an unbalanced tank circuit comprised of two unbalanced sections, and similar, otherwise than its unbalance, to the tank circuit of Fig. 1 and Fig. 11. The outer end 214 of the winding 201 is connected by a conductor 98 to the end 82 of the low-frequency tank circuit. The ends 207 and 217 of the coils 203 and 201 are connected together by a conductor 227. In an unbalanced circuit, it is possible to use the same apparatus with half as many condenser sections, by means of different connections. For use in unbalanced circuits, with one end of the tank coil operated at ground radio-frequency potential, the link coil 35 should be wound near the grounded end of the coil 5 rather than at the center. As, however, neither end of the coil 5 is at ground potential, and since the coil 1 is nearer to the ground radio-frequency potential, the link coil 35 should be wound near the grounded end of the coil 1.

This unbalanced circuit is particularly adapted to use in plate-tank circuits of radio-frequency pentodes or beam-power tubes. It may also be connected into the grid circuit of a single-tube radio-frequency amplifier, coupled to a crystal oscillator or other preceding driver stage (not shown). The plate circuit of the radio-frequency amplifier may be connected to the before-described balanced tank circuit to form a neutralizing circuit.

Further modifications will occur to persons skilled in the art, and all such are considered to fall within the spirit and scope of the invention, as defined in the appended claims.

What is claimed is:

1. An electric system comprising an inductor and a capacitor connected in parallel, a further parallel-connected inductor and capacitor connected in series with the first-named inductor at an intermediate point thereof, and a further parallel-connected inductor and capacitor connected at an intermediate point of the second-named inductor.

2. Electrical apparatus comprising two sections, one of the sections comprising two substantially axially disposed fixed windings separated from each other along their axis, a winding rotatably adjustable substantially in the region of separation of the two first-named windings, and means for maintaining electrical connection of the rotatable winding between the fixed windings during the rotatable adjustment of the rotatable winding, the other section comprising a loop rotatably adjustable with the rotatable winding and a winding within which the loop is inductively disposed, and means for connecting the last-named winding in series with the fixed windings.

3. Electrical apparatus comprising two sections, one of the sections having an inductor and a capacitor, the inductor comprising two substantially axially disposed fixed windings separated from each other along their axis and a winding rotatably adjustable substantially in the region of separation of the two first-named windings, the terminals of the rotatable winding being connected with respective terminals of the fixed windings during the rotatable adjustment of the rotatable winding, the capacitor comprising two series-connected condensers each having stationary and movable portions, the stationary portions being respectively connected to the other terminals of the fixed windings, and means for connecting the rotatable winding to the movable portions of the condensers, and the other section having a second inductor and a second capacitor, the second inductor comprising a loop adjustable with the rotatable winding and a winding within which the loop is inductively disposed, and the second capacitor comprising series-connected condensers having portions connected with the last-named winding, the second section being connected in series with the first-named section at an intermediate point thereof.

4. An electric circuit comprising an inductor, two series-connected condensers connected in parallel with the inductor, the inductor comprising an interrupted stator winding and a rotor winding connected to the inner ends of the stator winding, a second inductor, two series-connected condensers connected in parallel with the second inductor, the second inductor comprising an interrupted stator winding and a cooperating rotor, and means connecting the outer ends of the first-named stator winding to the inner ends of the second-named stator winding.

5. An electric circuit comprising an inductor, a condenser connected in parallel with the inductor, the inductor comprising an interrupted stator winding and a rotor winding connected to the inner ends of the stator winding, a second inductor, a condenser connected in parallel with the second inductor, the second inductor comprising a stator winding constituted of two spaced winding parts connected together at their inner ends and a cooperating rotor, and means for connecting the outer ends of the first-named stator winding in series with the second-named stator winding.

6. An electric system provided with a tank circuit having two parallel-connected adjustable balanced capacitances and inductances, each balanced capacitance being constituted of an adjustable balanced capacitor, each balanced inductance being constituted of an adjustable balanced inductor, the said capacitances and inductances of the tank circuit being balanced throughout their adjustment, and one of the parallel-connected capacitances and inductances being connected in series with the inductance of the other parallel-connected capacitance and inductance.

7. An electric system provided with a tank circuit having parallel-connected adjustable balanced capacitance and inductance, the balanced capacitance being constituted of two adjustable series-connected capacitors each having stationary and movable portions, the balanced inductance being constituted of a balanced stator winding comprising two substantially axially disposed fixed windings separated from each other along their axis and a rotor winding rotatably adjustable substantially in the region of separation of the fixed windings, the terminals of the rotatable winding being connected with respective terminals of the fixed winding during the rotatable adjustment of the rotatable winding, the other terminals of the fixed windings being connected to the stationary portions of the capacitors, and means connecting the rotatable winding to the movable portions of the capacitors so that the said capacitance and inductance of the tank circuit shall be balanced throughout their adjustment.

8. An electric system provided with series-connected low-frequency and high-frequency tank circuits each having parallel-connected adjustable balanced capacitance and inductance, each balanced capacitance being constituted of an adjustable balanced capacitor, each balanced inductance being constituted of a balanced stator winding comprising two fixed windings and a rotor winding balanced with respect to the stator winding, and the said capacitances and inductances of the tank circuits being balanced throughout their adjustment.

9. An electric system comprising a two-section inductor and a capacitor connected in parallel, a further parallel-connected inductor and capacitor connected in series with the first-named inductor at an intermediate point thereof, the two sections of the two-section inductor being connected in series with opposite sides of the capacitors, and a further parallel-connected inductor and capacitor connected at an intermediate point of the second-named inductor.

10. An electric system comprising an inductor comprising a two-part stator winding and a rotor winding connected to the inner ends of the two parts of the stator winding, a condenser electrically connected to the inductor, a second inductor comprising a stator winding constituted of two spaced winding parts and a cooperating rotor, a condenser electrically connected to the second inductor, and means for connecting the outer ends of the two parts of the first-named stator winding to the inner ends of the two spaced winding parts.

11. An electric system comprising a parallel-connected adjustable inductor and adjustable capacitor, and a further parallel-connected adjustable inductor and adjustable capacitor connected in series with the first-named inductor, the inductors and the capacitors being connected mechanically to render them simultaneously adjustable.

12. An electric system comprising a parallel-connected adjustable inductor and adjustable capacitor, and a further parallel-connected adjustable inductor and adjustable capacitor connected in series with the first-named inductor at an intermediate point thereof, the inductors and the capacitors being connected mechanically to render them simultaneously adjustable.

13. An electric system having a tank circuit provided with two terminals and an inductor and a capacitor, the inductor comprising two substantially axially disposed fixed windings separated from each other along their axis and a winding rotatably adjustable substantially in the region of separation of the fixed windings, the fixed windings each having an outer terminal and an inner terminal, the rotatable winding having terminals continuously connected to the inner terminals of the fixed windings during the rotatable adjustment of the rotatable winding, the capacitor having a balanced stator portion and a rotor portion, one of the portions having outer terminals connected to the outer terminals of the fixed windings, the outer terminals of the fixed windings being connected to the tank-circuit terminals to connect the inductor and the capacitor in parallel to the tank-circuit terminals, and means for mechanically connecting the rotatable winding and the rotor portion to render them simultaneously rotatably adjustable.

14. An electric system having a tank circuit provided with two terminals and two sections connected to the terminals, one of the sections having an inductor and a capacitor each provided with two outer terminals respectively connected to the tank-circuit terminals to connect the inductor and the capacitor in parallel to the tank-circuit terminals, the other section having a second inductor and a second capacitor each provided with two outer terminals respectively connected together to connect the second inductor and the second capacitor in parallel, means for connecting the said other section in series with the said one section at an intermediate point thereof, the inductors and the capacitors each having a stator and a rotor, and means for mechanically connecting the rotors to render them simultaneously rotatably adjustable.

15. An electric system having a tank circuit provided with two terminals and a continuously adjustable inductor and a continuously adjustable capacitor each provided with two outer terminals, the inductor having also an intermediately disposed terminal, the outer terminals of the inductor and the capacitor being respectively connected to the tank-circuit terminals to connect the inductor and the capacitor in parallel to the tank-circuit terminals, and means for mechanically connecting the inductor and the capacitor to render them simultaneously adjustable, the inductor and the capacitor being respectively balanced throughout their adjustment in order that alternating voltages between the tank-circuit terminals shall be balanced in the tank circuit with respect to the intermediately disposed terminal.

16. An electric system having a tank circuit provided with two terminals and continuously adjustable inductance and capacitance, the inductance comprising two inductors, each of the inductors being provided with two outer terminals connected to the tank-circuit terminals, one of the inductors having also an intermediately disposed terminal, the capacitance comprising a continuously adjustable capacitor in parallel with the inductance of both inductors and a continuously adjustable capacitor in parallel with the inductance of one only of the inductors, and means for mechanically connecting the inductance and the capacitors to render them simultaneously adjustable, the inductance and the capacitors being respectively balanced throughout their adjustment in order that alternating voltages of opposite polarity between the tank-circuit terminals shall be balanced in the tank circuit with respect to the intermediately disposed terminal.

17. An electric system comprising two terminals, a high-frequency network having balanced inductance and balanced capacitance and adjustable to have maximum impedance at any frequency in a predetermined range of frequencies, a low-frequency network having inductance and capacitance and adjustable to have maximum impedance at any frequency in a second predetermined range of frequencies, means connecting the networks to the terminals to cause the capacitance of the high-frequency network to cooperate with the capacitance of the low-frequency network, thereby to increase the resultant low-frequency-network capacitance, and to cause the capacitance of the low-frequency network to cooperate with the capacitance of the high-frequency network, thereby to decrease the resultant high-frequency-network capacitance, and means for simultaneously adjusting the networks.

18. An electric system having a tank circuit provided with two terminals and a continuously adjustable inductor and an adjustable capacitor each provided with two outer terminals and an intermediately disposed terminal, a radio-frequency choke coil, the outer terminals of the inductor and the capacitor being respectively connected to the tank-circuit terminals to connect the inductor and the capacitor in parallel to the tank-circuit terminals, the inductor and the capacitor being respectively balanced with respect to their respective intermediately disposed terminals throughout their adjustment in order that alternating voltages between the tank-circuit terminals shall be balanced in the tank circuit with respect to the intermediately disposed terminals, and means comprising the radio-frequency choke coil connecting the intermediately disposed terminals in order that they shall be maintained at substantially the same direct-current potential.

19. An electric system having a tank circuit provided with two terminals, an inductor having a stator part and a continuously adjustable rotor part, one of the parts comprising two sections each having an outer terminal and an inner terminal, the other part being connected to the inner terminals and having an intermediately disposed terminal, and a continuously adjustable capacitor having two outer terminals, the outer terminals of the inductor and the capacitor being respectively connected to the tank-circuit terminals to connect the inductor and the capacitor in parallel to the tank-circuit terminals, and means for mechanically connecting the rotor part and the capacitor to render them simultaneously adjustable, the inductor and the capacitor being respectively balanced throughout their adjustment in order that alternating voltages between the tank-circuit terminals shall be balanced in the tank circuit with respect to the intermediately disposed terminal.

20. An electric system having a tank circuit provided with two terminals, an inductor comprising an interrupted balanced stator winding and a continuously adjustable rotor winding, the stator winding having two outer terminals and two inner terminals, the rotor winding being connected to the inner terminals and having an intermediately disposed terminal, and a continuously adjustable capacitor having two outer terminals and an intermediately disposed terminal, the outer terminals of the inductor and the capacitor being respectively connected to the tank-circuit terminals to connect the inductor and the capacitor in parallel to the tank-circuit terminals, the rotor winding being balanced with respect to the balanced stator winding and the capacitor being balanced throughout the adjustment of the rotor winding and the capacitor in order that alternating voltages between the tank-circuit terminals shall be balanced in the tank circuit with respect to the intermediately disposed terminal of the rotor winding.

21. An electric system having a tank circuit provided with two terminals, an inductor comprising an interrupted stator winding and a continuously adjustable rotor winding, the stator winding having two outer terminals and two inner terminals, the rotor winding being connected to the inner terminals and having an intermediately disposed terminal, and an adjustable capacitor having two outer terminals and an intermediately disposed terminal, the outer terminals of the inductor and the capacitor being respectively connected to the tank-circuit terminals to connect the inductor and the capacitor in parallel to the tank-circuit terminals, and means connecting the intermediately disposed terminals.

22. An electric system having a tank circuit provided with two terminals, an inductor comprising an interrupted stator winding and a continuously adjustable rotor winding, the stator winding having two outer terminals and two inner terminals, the rotor winding being connected to the inner terminals and having an intermediately disposed terminal, and an adjustable capacitor having two outer terminals and an intermediately disposed terminal, a radio-frequency choke coil, the outer terminals of the inductor and the capacitor being respectively connected to the tank-circuit terminals to connect the inductor and the capacitor in parallel to the tank-circuit terminals, and means comprising the radio-frequency choke coil connected between the intermediately disposed terminals.

23. An electric system comprising two inductors, one of the inductors having a stator part and a rotor part, one of the parts comprising an interrupted winding, the other inductor having a stator part and a rotor part, one of the parts of the said other inductor comprising two windings, the two windings being connected in series with the interrupted winding, and means for mechanically connecting the rotors to render them simultaneously adjustable.

24. An electric system comprising two sections, one of the sections comprising an interrupted stator winding and a cooperating rotor winding connected to the inner ends of the stator winding, and the other section comprising a two-part stator winding and a cooperating rotor, the two parts of the two-part stator winding being connected in series with the interrupted stator winding and the cooperating rotor winding of the said one section, the cooperating rotor winding and the cooperating rotor being ganged to rotate as a unit.

25. An electric system provided with series-connected low-frequency and high-frequency tank circuits each having parallel-connected capacitance and inductance, each capacitance comprising a capacitor, each inductance comprising a stator and a rotor, means for adjusting the rotors, and means connecting the tank circuits to cause the capacitance of the high-frequency tank circuit to cooperate with the capacitance of the low-frequency tank circuit, thereby to increase the resultant low-frequency tank-circuit capacitance and to cause the capacitance of the low-frequency tank circuit to cooperate with the capacitance of the high-frequency tank circuit, thereby to decrease the resultant high-frequency tank-circuit capacitance.

26. An electric system having a tank circuit provided with two terminals, a continuously adjustable inductor and a continuously adjustable capacitor each provided with two outer terminals respectively connected to the tank-circuit terminals to connect the inductor and the capacitor in parallel to the tank-circuit terminals, an inductor having a stator part and a continuously adjustable rotor part, one of the parts comprising two sections each having an outer terminal and an inner terminal, the outer terminals being respectively connected to the inner terminals of the first-named inductor, a capacitor having two outer terminals respectively connected to the outer terminals of the sections to connect it in parallel to the second-named inductor, and means for mechanically connecting the first-named inductor, the rotor part and the capacitors to render them simultaneously adjustable.

27. An electric system having a tank circuit provided with two terminals and two sections connected to the terminals, one of the sections having an inductor and a capacitor, the inductor comprising two stator portions and a rotor portion, the stator portions each having an outer terminal and an inner terminal, the capacitor comprising two series-connected condensers each having a stator portion and a rotor portion, one of the portions of the capacitor having outer terminals respectively connected to the outer terminals of the inductor stator portions and to the tank-circuit terminals to connect the inductor and the capacitor in parallel to the tank-circuit terminals, the other section having an inductor and a capacitor, the second-named inductor comprising two substantially axially disposed fixed windings separated from each other along their axis and a winding rotatably adjustable substantially in the region of separation of the fixed windings, the fixed windings each having an outer terminal and an inner terminal, the rotatable winding having terminals continuously connected to the inner terminals of the fixed windings during the rotatable adjustment of the rotatable winding, the second-named capacitor comprising two series-connected condensers each having a stator portion and a rotor portion, one of the portions of the second-named capacitor having two outer terminals respectively connected to the outer terminals of the fixed windings, the outer terminals of the fixed windings being connected to the inner terminals of the stator portions of the first-named inductor, and means for mechanically connecting the rotatable winding, the rotor portion of the first-named inductor and the rotor portions of the condensers to render them simultaneously adjustable.

28. An electric system comprising two terminals, a high-frequency network having an inductor and a capacitor connected in parallel and adjustable to have maximum impedance at any frequency in a predetermined range of frequencies, a low-frequency network having an inductor and a capacitor connected in parallel and adjustable to have maximum impedance at any frequency in a second predetermined range of frequencies, each of the inductors having a two-section stator and a rotor, each of the sections of the low-frequency stator having an outer terminal and an inner terminal, the outer terminals being connected to the low-frequency capacitor and to the high-frequency inductor to cause the capacitance of the high-frequency network to cooperate with the capacitance of the low-frequency network, thereby to increase the resultant low-frequency-network capacitance, and to cause the capacitance of the low-frequency network to cooperate with the capacitance of the high-frequency network, thereby to decrease the resultant high-frequency-network capacitance, and means for simultaneously adjusting the rotors.

29. An electric system comprising an inductor comprising a two-part stator winding the two parts of which each has an outer end and an inner end, the inductor having also a rotor winding connected to the inner ends of the two parts of the stator winding, two series-connected condensers connected in parallel with the inductor, a second inductor comprising a two-part stator winding the two parts of which each has an outer end and an inner end, the second inductor having also a cooperating rotor, two condensers each having an outer end and an inner end, the inner ends of the second-named condensers being connected together to connect the second-named condensers in series, means for connecting the respective outer ends of the two parts of the second stator winding to the outer ends of the second-named condensers to connect the second-named condensers in parallel with the second inductor, and means connecting the outer ends of the two parts of the first-named stator winding to the inner ends of the two parts of the second stator winding to connect the two parts of the second stator winding in series with the first-named condensers.

30. An electric system provided with two terminals and two tank circuits connected to the terminals and each having continuously adjustable inductance and capacitance, each inductance being provided with two outer terminals connected to the first-named terminals, one of the inductors having also an intermediately disposed terminal, each capacitance comprising two continuously adjustable capacitors each provided with two outer terminals respectively connected to the first-named terminals to connect the inductance and the capacitors of each tank circuit in parallel to the first-named terminals, and means for mechanically connecting the inductances and the capacitors to render them simultaneously adjustable, the inductance and the capacitors of each tank circuit being respectively balanced throughout their adjustment in order that alternating voltages of opposite polarity between the first-named terminals shall be balanced in each tank circuit with respect to the intermediately disposed terminal.

THOMAS MURRAY FERRILL, JR.